S. A. BERRYHILL AND I. W. WOOLLEY.
AUTOMOBILE LOCK.
APPLICATION FILED OCT. 31, 1919.
1,343,807.
Patented June 15, 1920.
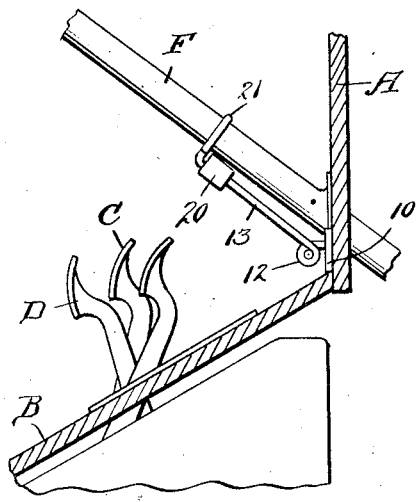
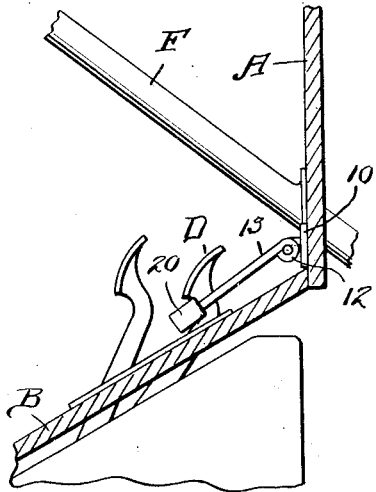
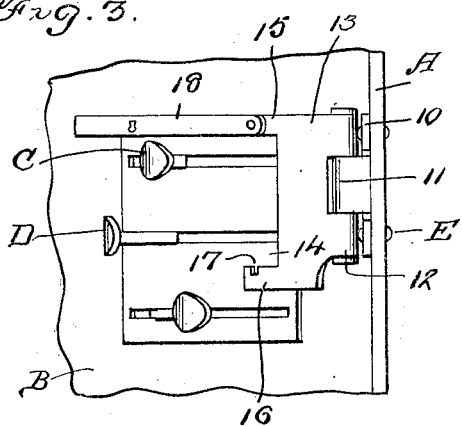
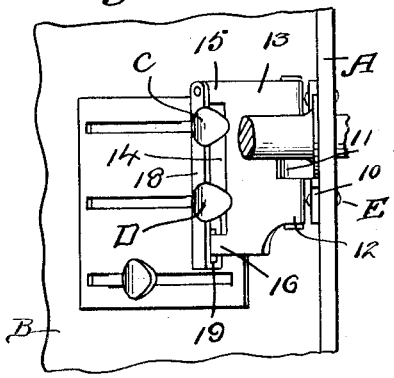
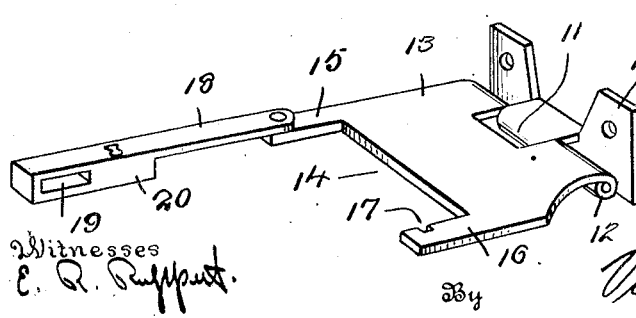
Inventor
S. A. Berryhill
I. W. Woolley

UNITED STATES PATENT OFFICE.

SAMUEL A. BERRYHILL AND ISAIAH W. WOOLLEY, OF CHARLOTTE, NORTH CAROLINA.

AUTOMOBILE-LOCK.

1,343,807.  Specification of Letters Patent.  Patented June 15, 1920.

Application filed October 31, 1919. Serial No. 334,658.

*To all whom it may concern:*

Be it known that we, SAMUEL A. BERRYHILL and ISAIAH W. WOOLLEY, citizens of the United States, residing at Charlotte, in the county of Mecklenburg and State of North Carolina, have invented new and useful Improvements in Automobile-Locks, of which the following is a specification.

This invention relates to locks for automobiles and has for its object the provision of a lock adapted for engagement with the foot pedals of an automobile whereby to prevent the pedals from movement so that theft will be prevented.

An important and more specific object is the provision of a lock structure in the nature of a plate which is hinged with respect to the dash of the automobile and which is adapted to engage against the clutch and reverse pedals and which is provided with a pivoted arm having locking means engaging against the rear edges of two pedals whereby the transmission will be locked in low and reverse gears so that any movement of the car will of course be prevented.

An additional object is the provision of a device of this character which will be simple and inexpensive in manufacture, easy to install, efficient in service, durable in use, and a general improvement in the art.

With the above and other objects and advantages in view the invention consists in the details of construction to be hereinafter more fully described and claimed, and illustrated in the accompanying drawings in which—

Figure 1 is a fragmentary longitudinal sectional view through the forward portion of an automobile showing our device applied thereto in side elevation, the lock being in inoperative position, Fig. 2 is a plan view in locked position, Fig. 3 is a plan view in unlocked position, Fig. 4 is a view similar to Fig. 1 showing the parts in locked position, and Fig. 5 is a perspective view of the device detached.

Referring more particularly to the drawings, the letter A designates the dash of a vehicle, B designates the floor boards, C designates the clutch pedal, and D designates the reverse pedal.

The parts above described are those constituting a portion of an automobile of a very popular make which is equipped with planetary gearing and which has three foot pedals. In carrying out our invention we provide a lock structure including a plate 10 which is apertured for the passage of the bolts E which secure the base of the steering post F upon the dash A. This plate 10 is provided with hinge knuckles 11 with which are pivotally engaged hinge knuckles 12 formed on the rear edge of a plate 13 which is disposed upon the top of the floor boards B and at its rear end this plate 13 is cut away to provide a recess 14 and spaced arms 15 and 16, the latter of which is provided with a lock bolt receiving recess 17. Pivoted upon the arm 15 is a bar 18 which has its free end provided with an opening 19 engageable over the arm 16. This bar 18 carries any suitable bolt lock 20, the bolt of which is adapted to enter the recess 17 for holding the bar 18 against movement.

In the use of the device under ordinary conditions, that is when the car is running, the bar 18 is disposed as shown, out of engagement with the arm 16, as shown in Fig. 3. If desired, the bar 18 may be engaged with the arm 16 and held up by a hook 21 mounted on the steering column, as shown in Fig. 1. In order to lock the car against movement it is necessary that the operator press the reverse pedal D and clutch pedal C forwardly so that they will be in lateral alinement with each other. Both pedals will then engage against the forward edge of the recess 14. The bar 18 is then swung upon its pivot so that the opening 19 therein receives the arm 16 and the lock is manipulated to force the bolt thereof into the recess 17. The transmission will thus be locked in low and reverse gears and it will be obvious that any attempt to move the vehicle will be a failure.

While we have shown and described the preferred embodiment of our invention it is of course to be understood that we reserve the right to make such changes as will fall within the spirit of the invention and the scope of the subjoined claim.

Having thus described our invention, we claim:

An automobile transmission lock comprising a plate secured in vertical position against the dash of an automobile, a rearwardly extending ear on said plate, a second plate having its forward edge provided with ears straddling and pivotally connected with said first named ear and having its rear edge provided with a cut-out portion defining spaced arms, said cut-out portion receiving the clutch and reverse pedals in their extreme forward positions, a bar pivoted upon one of said arms and movable to engage against the rear edges of the pedals whereby to prevent rearward movement thereof, the free end of said bar having an opening slidably engaging upon the other of said arms, and a lock mechanism carried by the bar, said other arm having a recess for the engagement of the locking mechanism.

In testimony whereof we affix our signatures.

SAMUEL A. BERRYHILL.
ISAIAH W. WOOLLEY.